Patented Mar. 13, 1934

1,950,735

UNITED STATES PATENT OFFICE 1,950,735

PROCESS FOR DESULPHURIZING HYDROCARBON OILS

Ime Levine, Chicago, Ill., assignor to Universal Oil Products Company, Chicago, Ill., a corporation of South Dakota No Drawing. Application March 5, 1931, Serial No. 520,475

4 Claims. (Cl. 196—24)

This invention relates to the treatment of hydrocarbon oils and refers more particularly to the treatment of the relatively lighter distillates produced in cracking processes.

More particularly the invention contemplates the treatment of such distillates with chemical reagent effective in removing large percentages of their content of undesirable sulphur compounds.

After treatment of cracked distillates with commoner treating agents such as sulphuric acid and various alkalies, the sulphur content of the cracked distillates is found to be reduced but reduction beyond a certain point is impractical because of the necessity of using amounts of reagents prohibitive from a cost standpoint and the fact that such further severe treatment, while it reduces the sulphur content, also removes large percentages of desirable hydrocarbon compounds unnecessarily. The present invention comprises improvements in methods of treating cracked distillates for the removal of sulphur compounds resistant to the action of the commoner treating reagents.

In one specific embodiment of the invention sulphur-containing hydrocarbon distillates are treated with ketones in the presence of such condensing agents as metal chlorides, for example, the chlorides of aluminum, zinc, tin or antimony.

The metallic compounds mentioned are known to be of use in producing reactions of condensation or polymerization in organic chemistry but I believe that their use in connection with ketones to remove sulphur compounds of the thiophene type is novel and useful. As an example of the ketones that may be employed may be mentioned acetone since this compound is readily procurable though homologues of the same have also been found useful in certain cases.

In conducting treatments comprised within the scope of the invention, different forms of equipment may be employed for insuring proper contact of the reagent materials with the oils. In cases where desirable results can be obtained at ordinary temperatures and pressures, treatments may be conducted in batch agitators, the ketone being added with the condensing agent in suspension or emulsification and contact insured by circulating from the bottom cone of the agitator through distributing means in the top. In cases where best results are obtained by the use of moderately elevated temperatures, the agitators may be designed to withstand pressure developed by the increased vapor pressure of the hydrocarbons. The reagents may also be injected at suitable points in continuous treating equipment consisting of alternate mixing and settling devices and in general any form of apparatus may be employed as the invention is not limited thereto.

As one example of results obtainable by the use of the invention in commercial work, the following may be cited. A distillate of approximate gasoline boiling point range obtained from the cracking of a heavy Mid-Continent residuum may be found to contain 0.4% sulphur which is reduced to 0.15% after the distillate has been treated with sulphuric acid to an amount equivalent to approximately 6 pounds per barrel of oil treated and the oil suitably washed and neutralized. When this primarily treated oil is further treated with 2% of acetone in the presence of minor amounts of zinc or aluminum chlorides as condensing agents, the residual sulphur-containing compounds may be removed to reduce the total content to approximately .05%, a percentage well within the limits imposed by practically any commercial specifications for motor fuel.

The operation is somewhat similar when employing other ketones or homologues of acetone such as propanone, butanone, methyl ethyl ketone and the like.

I claim as my invention:

1. A method of removing undesirable sulphur compounds from hydrocarbon distillates which comprises treating said distillate with a ketone capable of reacting with sulphur or sulphur compounds in the presence of a metallic condensing agent.

2. A method of removing undesirable sulphur compounds from hydrocarbon distillates which comprises treating said distillate with a ketone capable of reacting with sulphur or sulphur compounds in the presence of a metallic chloride condensing agent.

3. A method of removing undesirable sulphur compounds from hydrocarbon distillates which comprises treating said distillate with acetone in the presence of a metal chloride condensing agent.

4. A method of removing undesirable sulphur compounds from hydrocarbon distillates which comprises treating said distillate with acetone in the presence of a metallic condensing agent.

IME LEVINE.